United States Patent
Burke et al.

[11] Patent Number: 5,301,873
[45] Date of Patent: Apr. 12, 1994

[54] LOW FLUID INDICATOR FOR PRESSURIZED CANISTER

[75] Inventors: James O. Burke, Crystal Lake; Dean R. Solberg, Mundelein, both of Ill.

[73] Assignee: Kold Ban International, Algonquin, Ill.

[21] Appl. No.: 904,158

[22] Filed: Jun. 25, 1992

Related U.S. Application Data

[60] Continuation-in-part of Ser. No. 899,119, Jun. 15, 1992, which is a division of Ser. No. 499,053, Mar. 26, 1990, abandoned.

[51] Int. Cl.5 .................................................. F24D 5/00
[52] U.S. Cl. .................................... 237/53; 123/179.8; 454/337; 126/113; 222/71; 222/646
[58] Field of Search ...................... 239/71, 74; 222/71, 222/23, 24, 25, 32, 33, 34, 35, 36, 646; 123/179.8, 179.9; 237/53; 454/337; 126/113

[56] References Cited

U.S. PATENT DOCUMENTS

| | | | |
|---|---|---|---|
| 1,885,081 | 10/1932 | Clapp | 222/71 |
| 2,472,011 | 6/1946 | Graham . | |
| 2,523,373 | 5/1946 | Jennings et al. . | |
| 2,712,927 | 11/1949 | Blum . | |
| 3,158,081 | 11/1964 | Frost . | |
| 3,418,068 | 5/1965 | Gilbertson . | |
| 3,499,579 | 3/1970 | Garratt . | |
| 3,547,576 | 11/1970 | Sheikh . | |
| 3,804,388 | 4/1974 | Jamell . | |
| 3,966,407 | 6/1976 | Zuckerberg et al. . | |
| 4,067,692 | 1/1978 | Farris . | |
| 4,078,891 | 4/1978 | Madjar . | |
| 4,202,309 | 5/1980 | Burke . | |
| 4,260,107 | 4/1981 | Jackson . | |
| 4,444,720 | 4/1984 | Mayer . | |
| 4,481,451 | 11/1984 | Kautz et al. . | |
| 4,512,587 | 4/1985 | Burke et al. . | |
| 4,565,302 | 1/1986 | Pfeiffer et al. . | |
| 4,601,886 | 7/1986 | Hudgins . | |
| 4,677,902 | 7/1987 | Takemasa . | |
| 4,719,851 | 1/1988 | Chesnut . | |
| 4,774,916 | 10/1988 | Smith . | |
| 4,903,583 | 2/1990 | Frazier . | |
| 5,038,972 | 8/1991 | Muderlak et al. . | |

FOREIGN PATENT DOCUMENTS 8810122 12/1988 World Int. Prop. O. .

OTHER PUBLICATIONS

Zerostart "Smartshot" Starting Fluid Control System.

Primary Examiner—Henry A. Bennett
Attorney, Agent, or Firm—Willian Brinks Olds Hofer Gilson & Lione

[57] ABSTRACT

A low fluid indicator for a fluid injection system of the type having a sealed pressurized canister, and a valve responsive to a control signal to release fluid from the canister includes a counter that maintains a count. A pulse generating circuit increments the count by a first increment and a second increment in response to the control signal. The first increment is insensitive to the duration of the control signal above a threshold duration and is selected in accordance with a fill volume of the injection system. The second increment varies with duration of the control signal above the threshold duration and has a count rate selected in accordance with an injection flow rate of the injection system. A low fluid indicator lamp is responsive to the counter to indicator a low fluid condition when in the canister when the count exceeds a selected value.

8 Claims, 3 Drawing Sheets

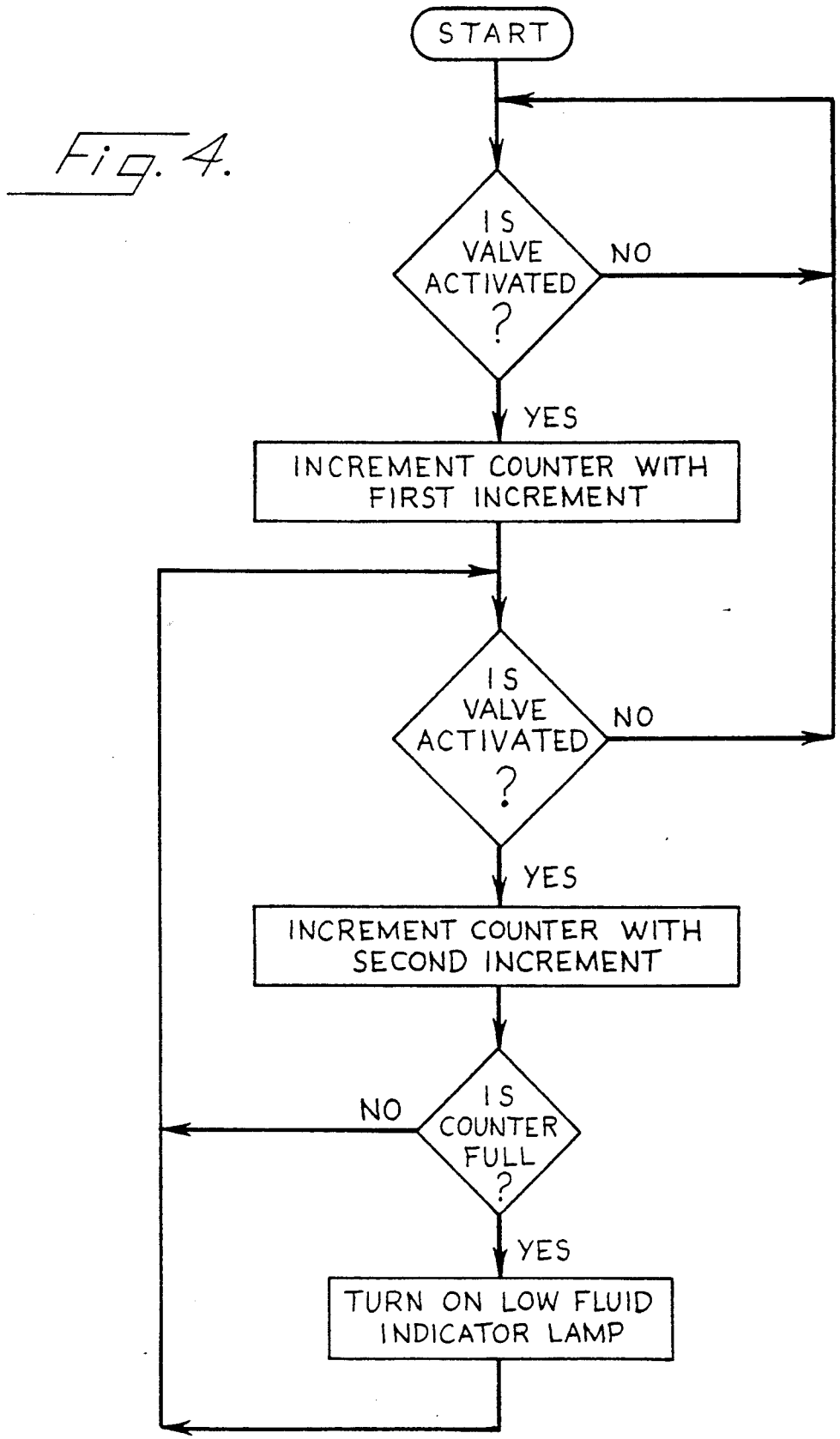

LOW FLUID INDICATOR FOR PRESSURIZED CANISTER

CROSS-REFERENCE TO RELATED APPLICATION

This application is a continuation-in-part of co-pending application Ser. No. 07/899,119, filed Jun. 15, 1992, which is in turn a division of application Ser. No. 07/499,053, filed Mar. 26, 1990, now abandoned. For completeness, the entire texts of these co-pending applications are hereby incorporated by reference into the present application.

BACKGROUND OF THE INVENTION

This invention relates to an apparatus for indicating a low fluid level in a pressurized canister, such as a pressurized starting fluid canister used in a starting fluid injection system for an internal combustion engine, or a disinfectant or deodorant canister used in an injection system for a forced air ventilation system.

One widely used type of fluid injection system includes a sealed, pressurized canister containing the fluid to be injected. This canister is connected to an injection nozzle by a conduit and an electromagnetic valve. On command, the valve is opened, thereby allowing pressurized fluid to escape from the canister for injection via the nozzle. Such systems are used, for example, to inject starting fluid into the intake manifold of an internal combustion engine as described in U.S. Pat. No. 4,202,309. Similarly, such systems have been proposed for use in introducing a disinfectant or deodorant into a forced air ventilation system, as described in my previous U.S. patent application Ser. No. 07/499,053.

One recurrent problem with such systems is that the user typically is not provided with any indication or warning that the canister is low on fluid. It would be advantageous if the user were provided with a warning indicating a low fluid condition in the canister. Of course, such a system should be reliable and low in cost if it is to achieve widespread acceptance.

In order to meet this need, my above identified U.S. patent application Ser. No. 07/499,053 described a low-fluid indicator useful in such systems. The disclosed low fluid indicator counts the total time the dispensing valve is commanded open and uses this count to calculate whether or not the treatment liquid supply in the sealed canister is near exhaustion. This calculation was based on the fact that the treatment liquid is discharged at a relatively constant flow rate through the injector nozzle, and this flow rate does not vary significantly as the level of liquid decreases in the canister. By multiplying the constant flow rate value by the total number of seconds the dispensing valve has been commanded open, the total amount of liquid dispensed from the canister is calculated. This amount is then compared with the known liquid capacity of the canister to determine if the fluid level in the canister is sufficiently low to require warning to the user. If the level of treatment liquid is determined to be excessively low, then an output indicator is activated to provide a suitable warning to the user.

The disclosed low fluid indicator functions well with systems in which the rate at which fluid is dispensed is substantially constant. The present invention is directed to an improved low fluid indicator that takes into account the variable flow rate through the valve under commonly encountered operating conditions. In this way, a more accurate and more reliable low fluid indicator can be provided.

SUMMARY OF THE INVENTION

The present invention is directed to a low fluid indicator for a fluid injection system of the type comprising a sealed pressurized canister containing a fluid under pressure, a valve coupled to the canister to selectively release fluid from the canister in response to a control signal, and an injector coupled to the valve to inject fluid released from the canister by the valve into a volume.

As described below, the low fluid indicator of this invention can include a counter that maintains a count and a pulse generating circuit effective to increment the count by a first increment and a second increment in response to the control signal. The first increment is insensitive to duration of the control signal above a threshold duration and is selected in accordance with a fill volume of the injection system. The second increment varies with duration of the control signal above the threshold duration and has a count rate selected in accordance with an injection flow rate of the injection system. The system described below also includes a low fluid indicator responsive to the counter to indicate a low fluid condition in the canister when the count departs from a selected range of values.

It has been discovered that for many fluid injection systems (particularly those of the type used to inject starting fluid into internal combustion engines), fluid is dispensed from the canister at a relatively higher rate until reservoir volumes within the system are filled at the start of an injection cycle. Once these reservoir volumes are filled, fluid is dispensed from the canister at a lower rate determined by the injection rate allowed by the injector. The system described below takes into account both of these effects, and thereby provides a more accurate and more reliable indication of a low fluid condition.

The invention itself, together with further objects and attendant advantages, will best be understood by reference to the following detailed description, taken in conjunction with the accompanying drawings.

BRIEF DESCRIPTION OF THE DRAWINGS

FIG. 4 is a flowchart showing operation of portions of the low fluid indicator of FIGS. 2 and 3.

DETAILED DESCRIPTION OF THE PRESENTLY PREFERRED EMBODIMENTS

Figure 1:
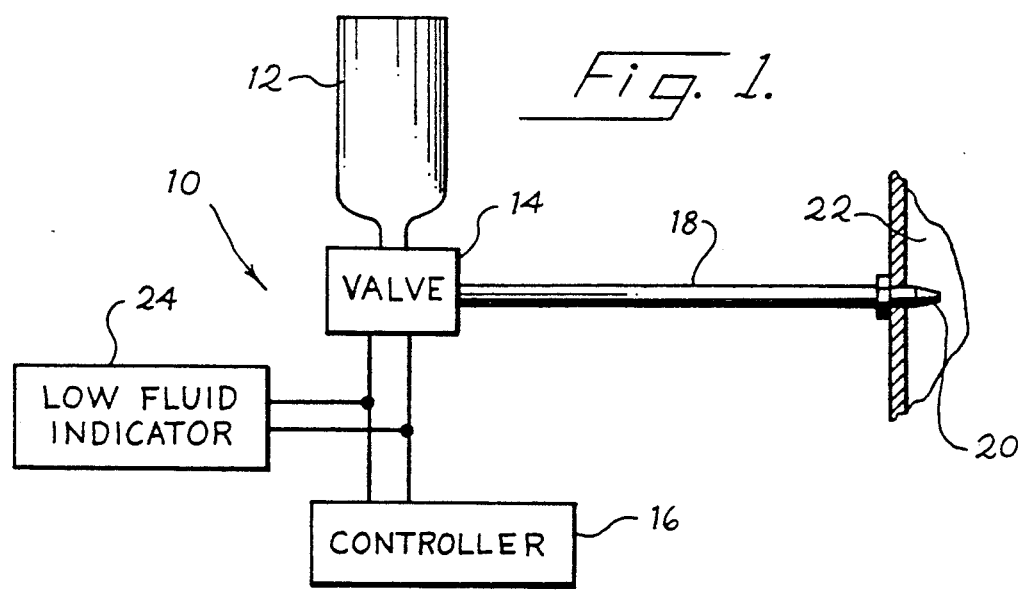
FIG. 1 is a block diagram of a fluid injection system which incorporates a preferred embodiment of the present invention.

Turning now to the drawings, FIG. 1 shows an injection system 10 which incorporates a presently preferred embodiment of this invention. This injection system 10 includes a sealed, pressurized canister 12 which contains a fluid to be dispensed. For example, if the system 10 is a starting fluid injection system for an internal combustion engine, the fluid in the canister 12 is typically an ether containing starting fluid. Alternately, if the system 10 is intended to disinfect or deodorize a space serviced by a forced air HVAC system, the fluid in the canister 12 can be a suitable deodorant or disinfectant.

The canister 12 is removably connected to a valve 14 which in this embodiment is a solenoid valve controlled by a controller 16. The valve 14 is connected via a conduit 18 to an injector 20 which is installed in a manifold 22. The manifold 22 may for example be the intake manifold of an internal combustion engine or a duct of a HVAC system. When the controller 16 commands the valve 14 open by supplying a suitable control voltage to the valve 14, the valve 14 allows pressurized fluid to travel in an uninterrupted fashion from the canister 12 via the conduit 18 and the injector 20 into the space defined by the manifold 22. The valve 14 and the conduit 18 define a fill volume which preferably acts as a reservoir which is filled with fluid and then dispensed through the injector 20 in each cycle of the valve 14. In many applications, the fill volume of the valve 14 and conduit 18 is chosen to provide continued injection of fluid for a preset period after the valve 14 is closed. This is particularly advantageous in automatic continuous flow starting fluid injection systems of the type described in U.S. Pat. No. 4,202,309.

The controller 16 can take any suitable form, and can be manually or automatically operated. In many applications, the controller 16 will include interlocks to prevent activation of the valve 14, as for example after an internal combustion engine has reached a preset temperature. The details of operation of the controller 16 form no part of the present invention and can be adapted to suit the intended application.

According to this invention, the system 10 includes a low fluid indicator 24 which receives input signals from the valve 14. In this embodiment, the low fluid indicator 24 is shown separate from the controller 16, though it will be apparent that if desired the low flow indicator 24 can be integrated into the controller 16.

Figure 2:
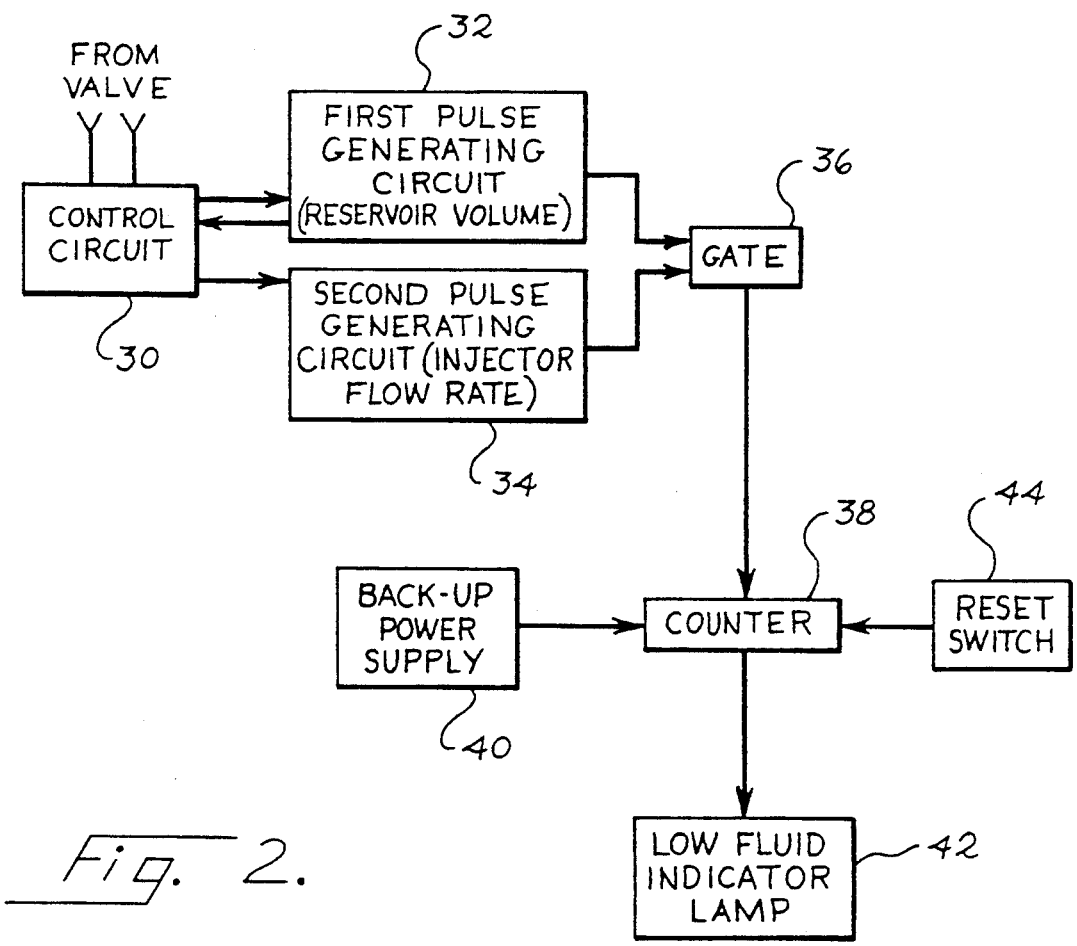
FIG. 2 is a block diagram of the low fluid indicator of FIG. 1.

Turning now to FIG. 2, the low fluid indicator 24 includes a control circuit 30 which is responsive to a control signal from the valve 14 and which in turn controls first and second pulse generating circuits 32 and 34. These pulse generating circuits 32, 34 supply pulses via a gate 36 to a counter 38. The counter 38 maintains a count indicative of the total of number of pulses supplied by both the first and second pulse generating circuits 32, 34. The counter is coupled to a back-up power supply 40 which maintains voltage to the counter 38 to preserve the integrity of the count. A low fluid indicator lamp 42 is controlled by the counter 38 such that the lamp 42 is illuminated whenever the count in counter 38 exceeds a preset threshold. A manually controlled reset switch 34 can be used by an operator to reset the counter 38 to zero, as for example when a new canister 12 is mounted on the valve 14.

The first and second pulse generating circuits 32, 34 differ in function and operation. The first pulse generating circuit 32 provides a selected number of pulses (a first increment) to the counter 38 for each cycle of the valve 14. This first increment is selected to correspond to the fill volume of the valve 14 and the conduit 18, and it takes into account the relatively high speed discharge of fluid from the canister 12 at the start of a cycle of the valve 14 when the fill volume is being filled. Thus, the first increment supplied by the first pulse generating circuit 32 has a maximum value which is provided once per cycle of the valve 14, and which does not vary in accordance with the duration the valve 14 is open beyond a threshold duration.

The second pulse generating circuit 34 provides a second set of pulses (a second increment) which is selected to vary in accordance with the flow rate of fluid out of the canister 12 after the fill volume of the valve 14 and the conduit 18 has been filled with fluid. This flow rate is determined by the flow rate allowed by the injector 20, and is typically lower than the initial flow rate accounted for by the first increment described above. The second increment varies according to the duration of the control signal above a threshold duration and is supplied at a count rate proportional to the fluid flow rate through the injector 20.

FIG. 4 provides a flow chart illustrating operation of the low fluid indicator 24. As shown in FIG. 4, once the valve 14 is activated the counter 38 is incremented with the first increment supplied by the first pulse generating circuit 32. Then the state of the valve is checked, and if the valve is still activated, the counter 38 is incremented with the second increment. If the counter is full, the low fluid indicator lamp 62 is turned on, but in either case, the state of the valve is again checked. If the valve remains activated, the counter 38 is again incremented with the second increment. This process continues until the valve is deactivated, at which time no further increments are supplied to the counter 38.

Figure 3:
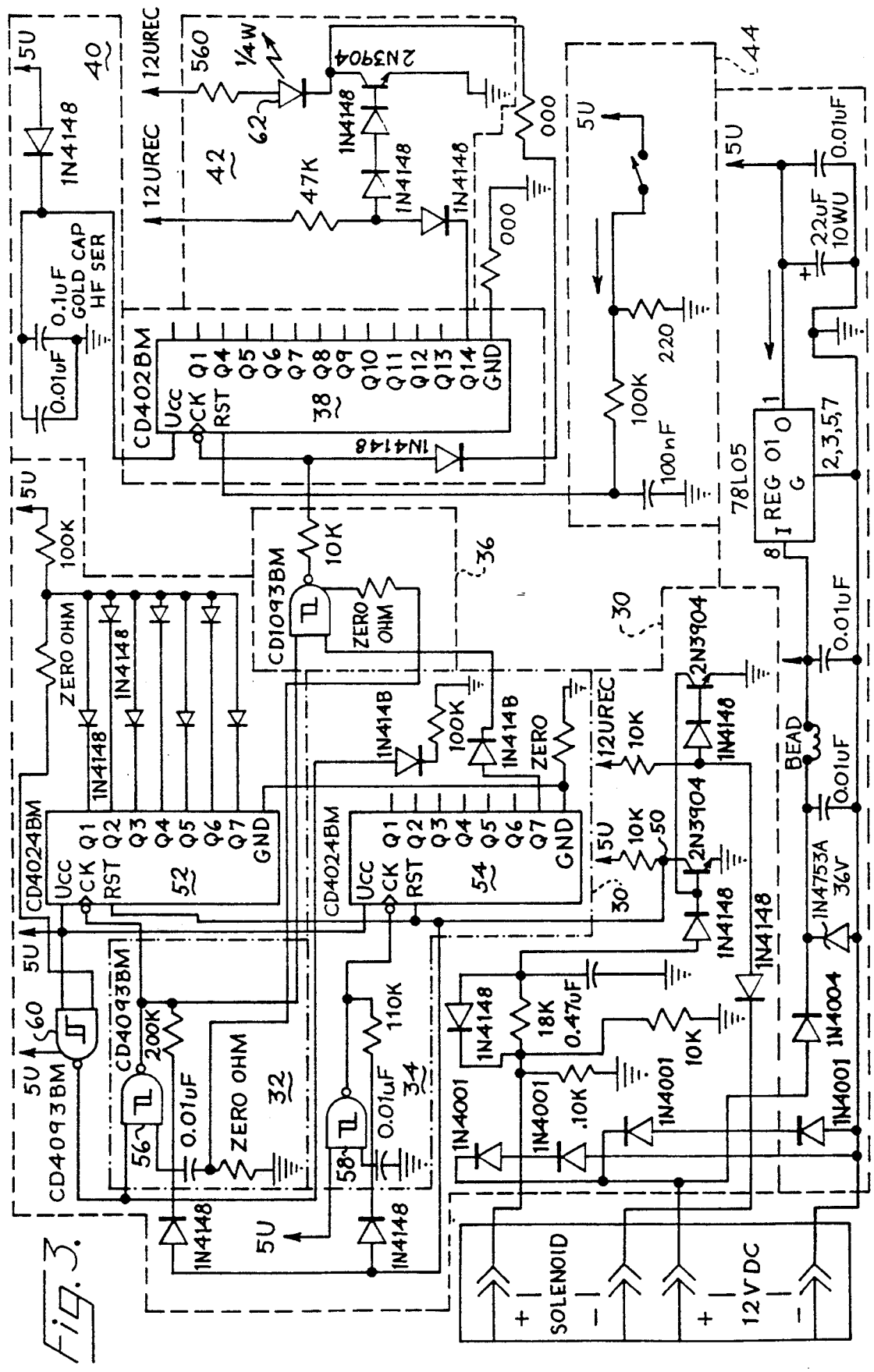
FIG. 3 is a schematic diagram of the low fluid indicator of FIG. 2.

FIG. 3 provides a detailed schematic diagram of the low fluid indicator 24, in which the components of FIG. 2 are illustrated. Briefly speaking, when the valve 14 is closed the voltage at point 50 goes low, thereby enabling the counters 52, 54 and the oscillators 56, 58. Once the oscillator 56 is enabled, the first series of pulses is supplied via the gate 36 to the counter 38. These first pulses represent the first increment discussed above. These first pulses are also counted in the counter 52. When the counter 52 reaches a preset count (determined by the presence or absence of connections at selected ones of the outputs of the counter 52), the gate 60 is disabled. This can be done, for example, by connecting outputs Q1, Q3, Q6 and Q7 to the input of the gate 60.

Once disabled, the gate 60 disables the oscillator 56 and allows the oscillator 58 to supply pulses via the counter 54 to the gate 56. In this embodiment, the counter 54 is used as a divide by 128 counter, and the oscillator 58 provides pulses at a rate proportional to the flow rate of the injector 20. The pulses supplied by the counter 58 to the gate 56 are the second increment described above. Pulses supplied to the gate 56 are passed to the counter 38, and when the counter 38 reaches a threshold value (8192 counts in this embodiment), the low fluid indicator lamp 62 is illuminated. The user can reset the counter 38 when the canister 12 is replaced with a full canister by manually closing the reset switch 44.

From the foregoing, it should be apparent that an improved low fluid indicator has been described which maintains a count as a function of both the number of valve cycles and the duration the valve is open. As explained above, the number of valve cycles is important because at the start of each cycle, the flow rate of fluid out of the canister 12 is relatively high as the system 10 is being filled with fluid. The duration of valve opening (at least above a threshold duration) is also important, because after the system 10 is filled the flow rate of fluid out of the canister 12 is determined by the flow rate of fluid out of the injector 20. By taking into account both of these effects, a more accurate indication of the fluid level in the canister is provided.

Of course, it should be understood that a wide range of changes and modifications can be made to the preferred embodiment described above. For example, this invention can readily be implemented as a programmed computer, in which the count is maintained as a variable in a program, and in which increments are provided to the count based on software implemented decisions. As used herein the terms counter, count, increment and the like are all intended broadly to encompass such software implemented embodiments of this invention.

The term increment is intended broadly and can include increments by a negative number. Furthermore, pulses can be either electrical pulses or their software equivalent. In addition, when the second increment is said to be sensitive to valve opening above a threshold duration, it is intended that this increment may additionally be sensitive to valve opening prior to this threshold value if desired.

Simply to define the best mode presently contemplated by the inventor and not to limit the scope of the following claims, the following details of construction are provided. In this embodiment, the count maintained in the counter 38 is calibrated such that 12.6 units of the count correspond to one milliliter of fluid in the canister. The canister 12 of this embodiment has an initial fluid volume of 700 ml and the first and second oscillators 56, 58 are designed to oscillate at 360 Hz and 755 Hz, respectively. The output of the counter 52 that is used to define the threshold duration is in this embodiment equal to 101, which corresponds to a fill volume of 8 ml. The 755 Hz oscillation rate of the second oscillator 58 corresponds to an injector flow rate of 0.475 ml per second. The 8192 count threshold causes the lamp 62 to be illuminated after about 650 ml of fluid has been dispensed from the canister. Of course, all of these parameters are specific to the particular application, and they can readily be modified as appropriate for a canister of a different volume, a system of a different fill volume or an injector of a different flow rate. Of course, the first and second increments described above can be added either in the disclosed order or the reverse order, as appropriate.

It is therefore intended that the foregoing detailed description be regarded as illustrative rather than limiting, and that it be understood that it is the following claims, including all equivalents, which are intended to define the scope of this invention.

I claim:

1. A low fluid indicator for a fluid injection system of the type comprising a sealed, pressurized canister containing a fluid under pressure, a valve coupled to the canister to selectively release fluid from the canister in response to a control signal, and an injector coupled to the valve to inject fluid released from the canister by the valve into a volume, said low fluid indicator comprising:
    a counter that maintains a count;
    a pulse generating circuit effective to increment the count by a first increment and a second increment in response to the control signal, said first increment insensitive to duration of the control signal above a threshold duration and selected in accordance with a fill volume of the injection system, said second increment varying with duration of the control signal above the threshold duration and having a count rate selected in accordance with an injection flow rate of the injection system; and
    a low fluid indicator responsive to the counter to indicate a low fluid condition in the canister when the count departs from a selected range of values.

2. The invention of claim 1 wherein the volume is defined by a ventilation duct of a heating system.

3. The invention of claim 1 wherein the volume is defined by an air intake manifold of an internal combustion engine.

4. The invention of claim 1 wherein the pulse generating circuit comprises:
    a first pulse generating circuit coupled to the counter;
    a second pulse generating circuit coupled to the counter; and
    a control circuit responsive to the control signal and operative to control the first pulse generating circuit to produce a first set of pulses for the counter, and to control the second pulse generating circuit to produce a second set of pulses for the counter, said first and second sets of pulses being equal in number to said first and second increments, respectively.

5. The invention of claim 4 wherein the control circuit enables the first pulse generating circuit for an initial time period after the control signal appears until said first set of pulses has been produced, and wherein the control circuit then disables the first pulse generating circuit and enables the second pulse generating circuit until the control signal is removed.

6. A low fluid indicator for a fluid injection system of the type comprising a sealed, pressurized canister containing a fluid under pressure, a valve coupled to the canister to selectively release fluid from the canister in response to a control signal, and an injector coupled to the valve to inject fluid released from the canister by the valve into a volume, said low fluid indicator comprising:
    a counter that maintains a count;
    means for incrementing the count by a first increment every time the control signal appears and remains for a threshold duration, said first increment insensitive to duration of the control signal above the threshold duration;
    means for incrementing the count at a selected count rate during a time interval when the control signal is present, said time interval varying with duration of the control signal above the threshold duration; and
    a low fluid indicator responsive to the counter to indicate a low fluid condition in the canister when the count departs from a selected range of values.

7. The invention of claim 6 wherein the first increment is a constant value selected in accordance with a fill volume of the injection system.

8. The invention of claim 7 wherein the selected count rate is selected in accordance with an injection flow rate of the injection system.

* * * * *